Feb. 22, 1927. 1,618,828
T. L. JONES
AUTOMATIC TEMPERATURE CONTROLLING APPARATUS
Filed March 21, 1923  2 Sheets-Sheet 1
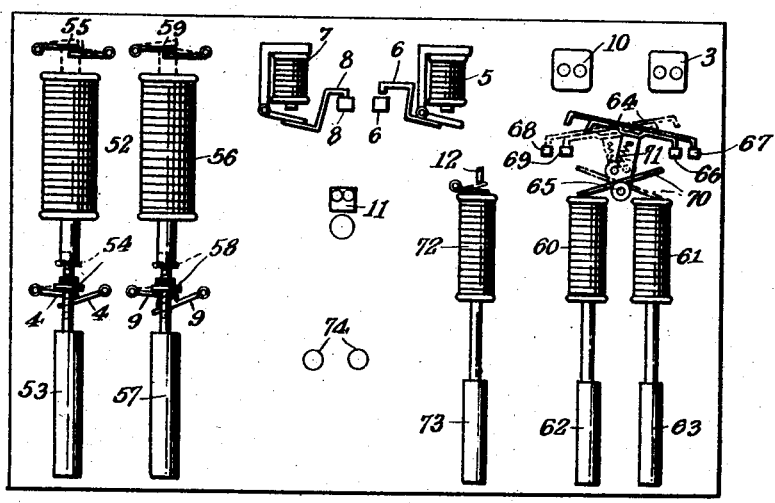
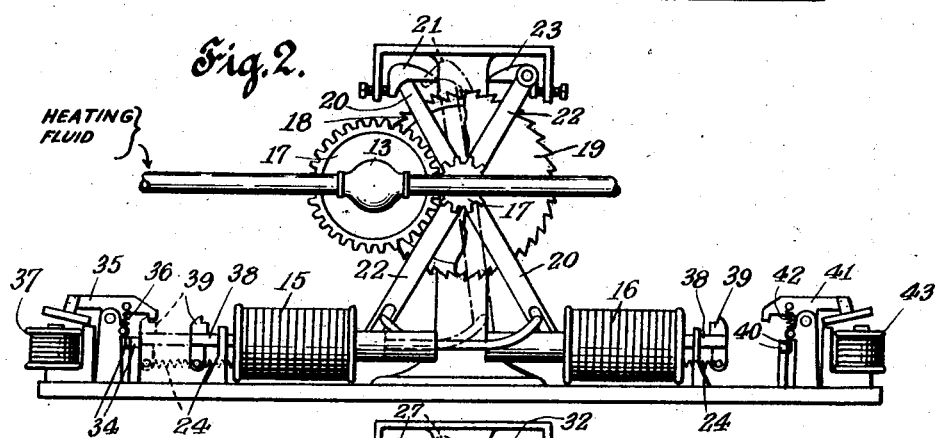
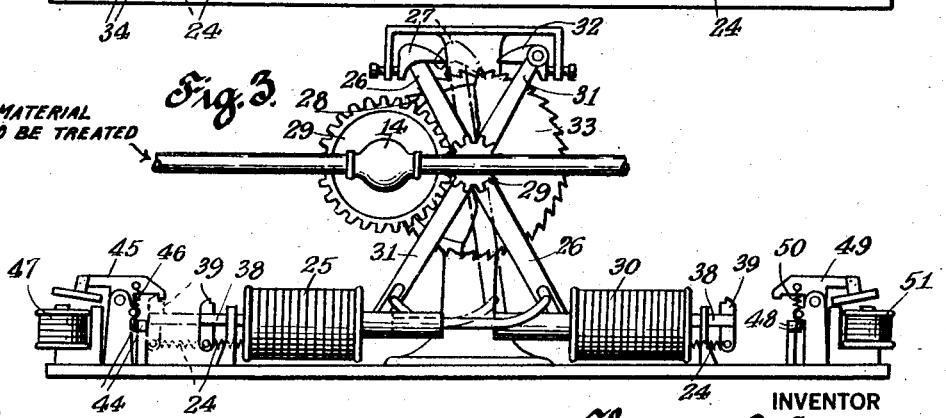
INVENTOR
Thomas L. Jones
BY Francis E. Boyce
ATTORNEY Feb. 22, 1927.
T. L. JONES
1,618,828
AUTOMATIC TEMPERATURE CONTROLLING APPARATUS
Filed March 21, 1923   2 Sheets-Sheet 2

INVENTOR
Thomas L. Jones
BY
Francis E. Boyce
ATTORNEY

Patented Feb. 22, 1927.

1,618,828

UNITED STATES PATENT OFFICE.

THOMAS LOFTUS JONES, OF CHRISTCHURCH, NEW ZEALAND.

AUTOMATIC TEMPERATURE-CONTROLLING APPARATUS.

Application filed March 21, 1923, Serial No. 626,711, and in New Zealand April 13, 1922.

This invention relates to Pasteurizing, evaporating, drying and such like operations wherein the substance under treatment is heated by means of the flow of a heated fluid such for example as steam, hot air, hot water, or the like.

It is the object of the present invention to provide for use in conjunction with apparatus for this purpose, means whereby the said temperature may be automatically regulated to suit the requirements of the process.

In carrying this object into effect the invention comprises briefly thermostatic means arranged within the thermal influence of the material under treatment, such thermostatic means being adapted to control contacts which operate to open and close a low voltage electric circuit or circuits in which are contained relays controlling a circuit or circuits preferably of relatively higher voltage and in which are included electro-magnetic means operating to mechanically control, either the flow of the heating medium such as steam, or the flow of the material under treatment or both.

The invention is applicable therefore, either to a system in which the material under treatment is caused to circulate through the heating vessel, or to what is known as the "vat system" in which the material under treatment is subjected to heat while stationary in a heating vessel. In the former case either or both methods of control may be employed, while in the latter case such control will be applied to the heating medium only.

In order that the nature of the invention may be clearly understood, it will now be particularly described and explained with reference to the accompanying drawings in which:—

Fig. 1 shows a switch board containing the circuit-controlling apparatus.

Fig. 2 shows the electro-magnetic means employed in controlling the flow of the heating medium.

Fig. 3 shows the electro-magnetic means employed in controlling the flow of the material under treatment, the construction of such means being here shown as identical with that of Fig. 2.

Figure 7:
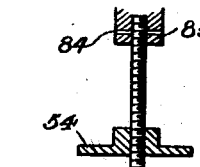
Figure 5:
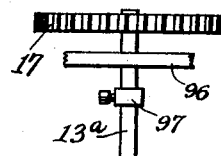
Figure 8:
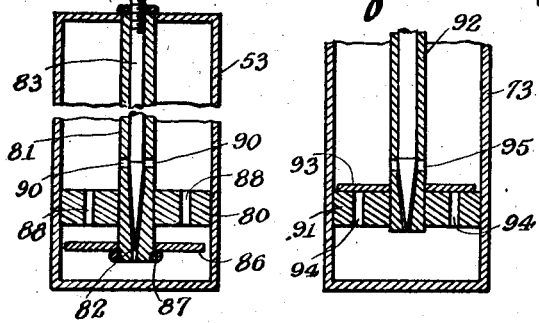
Figure 6:
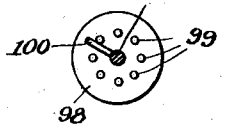

Fig. 5 is a broken away side view illustrating means for limiting the opening of the steam regulating valve, Fig. 6 is a sectional end view illustrating means for limiting the opening of the material regulating valve, Fig. 7 is a vertical sectional view illustrating the details of construction of one of the dash-pots forming a part of the apparatus; and Fig. 8 is a fragmentary sectional view of another dash-pot embodied in the apparatus.

In carrying out the invention thermostatic means are provided and arranged in proximity to the material under treatment so as to be subject to the thermal influence of the latter.

As here shown the said thermostatic means consist of two ordinary mercury thermometers 1 and 2 (Fig. 4) having electrical connections fused through the glass at the required points in order that they may serve to open and close circuits at certain required degrees of temperature. If so desired however, any other appropriate form of thermostatic means may be employed for this purpose.

As here shown the thermometer 1 is arranged to bridge its contacts at a temperature of 205° Fahrenheit and over, while the other thermometer 2 is arranged to similarly bridge its contacts at a temperature of 195° Fahrenheit and over, the intention being to maintain the temperature of the material under treatment constantly within the range comprised between these two points which represents the correct temperature for the Pasteurization of cream. This setting of the thermostatic means is however, given merely by way of example and will, of course, be varied to suit the requirements of different processes and materials treated thereby.

Connected with a suitable source of electric current, such, for example, as a battery 3, is a circuit containing in series the two contacts of the thermometer 1, a pair of normally closed make-and-break contacts 4 and the winding of a relay 5 adapted when in the inert condition to maintain its controlled contacts 6 apart, while similarly contained in a second low voltage circuit, which may be connected with the same source 3, are arranged in series the contacts of the other thermometer 2, and the winding of a relay 7 adapted when in the inert condition to permit its controlled contacts 8 to lie in the closed condition.

In the last mentioned circuit there is arranged in shunt with the contacts of the thermometer 2, a pair of normally open make-and-break contacts 9, the arrangement being such therefore that the winding of the relay 7 may be placed in closed circuit with the source 3 either by the action of the thermometer 2 in bridging its contacts or by the closing of the contacts 9.

A second battery 10 may also be provided to supply current to a circuit containing in series a bell 11 and make-and-break contacts 12 which operate in the manner and for the purpose hereinafter explained.

13 is a valve adapted to control the flow of steam or other heating fluid to the heating vessel in which the process is carried out and 14 is a valve adapted to control the flow of the material under treatment, each of such valves 13 and 14 being adapted to be actuated by electro-magnetic means contained in electric circuits preferably of relatively higher voltage than the circuits already mentioned, such higher voltage circuits being controlled by the operation of the relays 5 and 7.

As here shown, in the case of the valve 13 the said electro-magnetic means consist of two solenoids 15 and 16, the former operating to close such valve and the latter operating to open the same. For this purpose there is operatively connected with the valve 13, as by means of suitable gearing 17 a pair of ratchet-wheels 18 and 19 the former being shown partly broken away in order to reveal the other wheel 19 behind it. Operatively connected with the core of the solenoid 15 as by means of a lever 20 is a pawl 21 adapted to engage with the teeth of the ratchet-wheel 18, for the purpose of closing the valve and similarly connected with the core of the solenoid 16 as by means of a lever 22 is a pawl 23 adapted to engage the teeth of the ratchet-wheel 19 for the purpose of opening such valve.

Each of the said cores is provided with a spring 24 which serves to carry the core into its normal or inward position here shown, when the solenoid is inert, thereby placing its corresponding pawl in the position of disengagement with the ratchet-wheel.

Upon either of such solenoids becoming energized however its core will be caused to move outwards thereby placing its pawl in engagement with the teeth of its corresponding ratchet-wheel and turning the latter, such action in the case of the solenoid 15 being here indicated in dotted lines, Fig. 2. In this manner an energizing of the solenoid 15 will effect a closing of the valve 13, while an energizing of the solenoid 16 will result in an opening of such valve.

In a similar manner the valve 14 is adapted to be closed by the energizing of a solenoid 25 the movement being transmitted from the core of such solenoid through a lever 26, pawl 27, ratchet-wheel 28 and gearing 29, while similarly the opening of such valve results from the energizing of the solenoid 30 the movement of the core being transmitted through the lever 31, pawl 32, ratchet-wheel 33 and gearing 29. The cores of the solenoids 25 and 30 are also provided with springs 24 similar to those of the solenoids 15 and 16.

The core of the solenoid 15 is adapted on reaching the extremity of its operative movement to close a pair of normally open make-and-break contacts 34 and to be locked in this position by means of a detent 35 controlled in its engaging position by a spring or the equivalent 36 and provided with an electro-magnetic release 37. As here shown this purpose is preferably effected by providing such core with an extension or rod 38 which serves to operate the contacts 34 and carrying also a projection 39 with which the detent 35 is adapted to engage, as indicated in dotted lines, Fig. 2.

In like manner the core of the solenoid 16 on completion of its operative movement closes normally open make-and-break contacts 40 and becomes locked by a detent 41 having a controlling spring 42 and electro-magnetic release 43.

In a precisely similar manner the core of the solenoid 25 will on completion of its operative movement close normally open contacts 44 and become locked by a detent 45 having a controlling spring 46 and electro-magnetic release 47, as indicated in dotted lines Fig. 3, while the core of the solenoid 30 on completion of its operative movement will close normally open make-and-break contacts 48 and become locked by a detent 49 having a controlling spring 50 and electro-magnetic release 51. For this purpose the cores of each of the solenoids 16, 25, and 30 will, similarly to that of the core of the solenoid 15, be each provided with an extension 38 and detent-engaging projection 39.

As here shown also the said rod 38 may in each case be employed as a means of connecting the controlling spring 24 to the core of the solenoid.

There is provided, and preferably mounted upon the switch board, a solenoid 52, the core of which is adapted when such solenoid is inert, to sink by gravity against the restraining influence of a dash-pot 53 into the position here shown in full lines in Fig. 1.

The said core is provided, at its point of junction with the plunger of the dash-pot, with a plate 54 which in this position of the core serves to maintain the low-voltage contacts 4 in their normal closed condition as already mentioned. Upon the solenoid 52 becoming energized however, it will raise its core into the position shown in dotted lines Fig. 1. Thereby permitting the contacts 4 to open and then closing a pair of normally open contacts 55.

There is provided also another solenoid 56 which when inert permits its core to sink by gravity against the restraining influence of a dash-pot 57 into the position here shown in full lines, such core being, similarly to that of the solenoid 52, provided with a plate or flange 58 which in this position of the core serves to maintain the low voltage contacts 9 in their normal open condition already mentioned. Upon the said solenoid 56 becoming energized however, it will raise its core into the position indicated in dotted lines, Fig. 1, thereby permitting the contacts 9 to close and then closing a pair of normally open contacts 59.

Both of the dash-pots 53 and 57 are adapted to permit their respective cores to move quickly at the completion of their sinking movement in order that the contacts 4 and 9 may be sharply and positively restored to their normal positions. For this purpose the cylinders of the dash-pots 53 and 57 are formed at points near their lower ends with ports or grooves adapted to permit the air or other fluid employed in such dash-pots freely to pass the plungers. The said dash-pots will also be provided with the customary needle-valves or other means for regulating the passage of such fluid when the plungers are moving in the upper portions of the cylinders, in order that the speed of operation may be adjusted as required.

Provision is also preferably made for adjusting the height of each of the plates 54 and 58 in relation to the cores of the solenoids 52 and 56 in order that the contacts 4 and 9 may be operated thereby at the correct stages in the movement of the cores, this purpose being preferably effected by forming the connecting rods, between the said cores and the plungers of their respective dash-pots, with screw threads upon which the said plates are adapted to be screwed, suitable lock-nuts being preferably provided to secure such plates in position after the said adjustment has been made.

The dash-pots 53 and 57 are identical in construction, and therefore a description of dash-pot 53 will suffice for both. As shown in Fig. 7, the dash-pot cylinder is provided with a piston 80 secured to a tubular rod 81, which is slidable through the top of the cylinder. The bore of the rod 81 converges at its lower end to form a seat for a needle valve 82, the stem 83 of which extends axially through the piston rod and is threaded therein for a portion of its length, thereby to permit adjustment of the valve relative to its seat. The stem 83 is extended beyond the piston rod and is connected at its upper end by a pin 84 with the core 85 of the solenoid 52, the plate 54 being threaded on said extended portion for adjustment of said plate as above described. Below the piston 80 is slidably mounted on the piston rod a disk 86 of somewhat smaller diameter than the interior of the cylinder, thereby to provide an annular space between it and the cylinder wall for the passage of fluid, said disk being retained on the rod by a nut 87. Openings 88 are formed in the piston, also for the passage of fluid from one side of the piston to the other. From this construction it will be seen that during the upward stroke of the piston disk 86 will rest on the nut 87 and thus be clear of the piston and consequently the fluid within the cylinder will be permitted to pass freely through the openings 88 and the annular space between the disk 86 and the cylinder wall, so that said fluid presents practically no resistance to the movement of the piston. During the return or down stroke of the piston, however, the disk 86, owing to the pressure of the fluid below the same, will seat itself on the underside of the piston, thereby closing the openings 88, so that the fluid, being unable to escape through said openings, is forced to pass upward through the needle valve to the interior of the piston rod, whence it escapes through radial ports 90 into the cylinder space above the piston.

There is provided also and mounted preferably upon the switch-board an electromagnetically operable change-over switch which preferably comprises, as here shown, a pair of solenoids 60 and 61 adapted when inert to permit their cores to sink by gravity into their lower positions, such cores being adapted when their solenoids are energized to rise against the tendencies of dashpots (one for each) and here designated 62 and 63 respectively, as shown in Fig. 1. Controlled by the said solenoids 60 and 61 in the manner hereinafter explained, is a rocking arm 64 pivoted as at 65 and adapted to be turned into one position in which it establishes electrical connection with a pair of mercury cups or other suitable contacts 66 and 67, or into another position in which it establishes similar contact with a second pair of mercury cups or contacts 68 and 69. As here shown this movement is transmitted to the arm 64 by means of a second rocking arm 70 (Fig. 1) independently pivoted as upon the said pivot 65 and connected to the arm 64 by means of a spring 71, the arrangement being such that by turning the arm 70 from one extreme position to the other the tension exercised by the spring upon the arm 64 will thereby be transferred from one side of the said pivot to the other thereby causing the arm 64 to transfer its contact sharply and positively from one pair of contacts to the other. The said arrangement is such that if the arm 64 is in the position here shown in full lines and the solenoid 60 is energized it will raise its core thereby engaging and raising its adjacent end of the arm 70, thus causing the arm 64 to break its connection with the contacts 66 and 67 and to close with the contacts 68 and 69, as indicated in dotted lines. Similarly upon the solenoid 61 becoming energized it will lift its core and so raise its adjacent end of the arm 70 thereby turning the arm 64 into its position of connection with the contacts 66 and 67.

Electro-magnetic means are provided for closing the contacts 12, such means consisting preferably of a solenoid 72 which when inert allows its core to sink by gravity and so permitting such contacts 12 to occupy their normal open condition. Upon the said solenoid becoming energized however, it will raise its core against the restraining influence of a dash-pot 73, thereby closing the contacts as indicated in dotted lines Fig. 1.

The dash-pots 62, 63 and 73 are similar in construction to those hereinbefore described, but are designed to restrain the upward instead of the downward movement of the piston. In Fig. 8 is illustrated a sectional view of the lower part of dash-pot 73, which is identical with dash-pots 62 and 63, and therefore a description of one will suffice for all. In these dash-pots, the piston 91 is secured at the extreme end of the tubular piston rod 92, while the disk 93 is disposed above the piston. It will thus be seen that as the piston descends the disk will be separated from the piston by the pressure of the fluid passing freely through openings 94 in the piston, while on the upward movement of the piston the disk seats itself thereon, thus closing said openings and causing the fluid to be forced through radial openings 95 into the hollow piston rod, whence it escapes through the needle valve.

74 represents the terminals of a suitable source of electric current such for example, as that of an ordinary lighting supply or the like of relatively higher voltage than that supplied by the aforementioned source 3.

Figure 4:
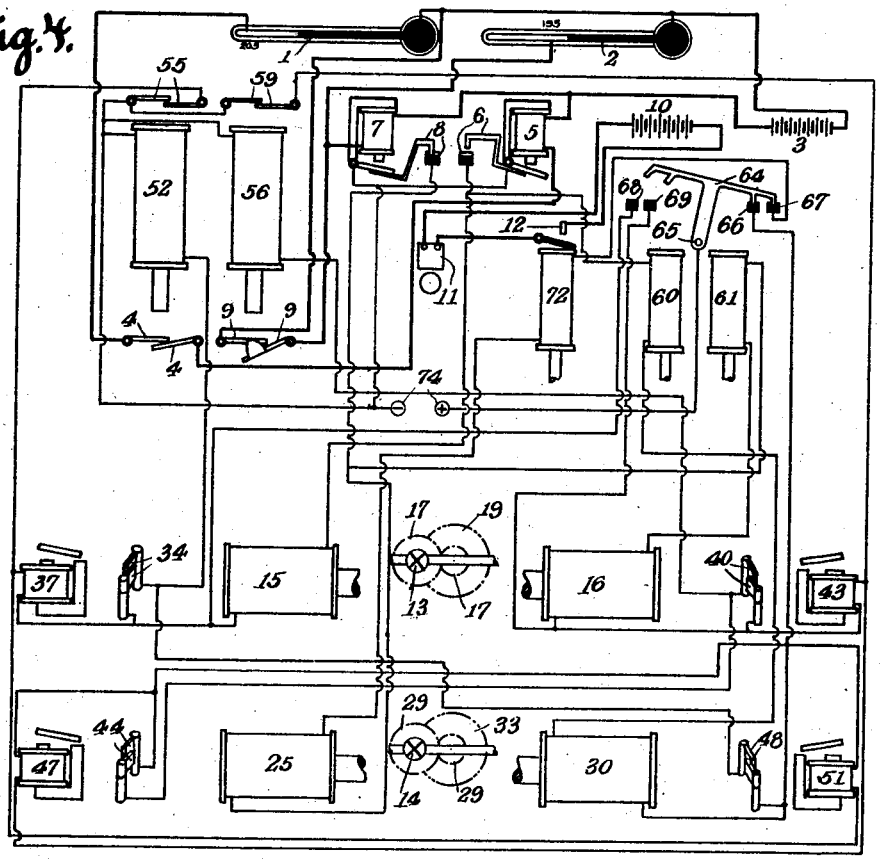
Fig. 4 is a diagram of wiring showing the various electric circuits and their connections with the apparatus appearing in the foregoing figures.

The windings of the solenoids 15, 16, 25, 30, 52, 56, 60, 61 and 72; the windings of the electro-magnetic releases 37, 43, 47 and 51; the contacts 34, 40, 44, 48, 55, 59, 66, 67, 68, 69 and the arm 64 are connected with the terminals 74 as shown in Fig. 4 namely as follows:—

The winding of the solenoid 15 is in series with the contacts 6 of the relay 5 and the contact 68 and thence with the arm 64 when the latter is in its position of connection with such contact. The winding of the solenoid 16 is in series with the contacts 8 of the relay 7, the winding of the solenoid 61 and the contact 69 and thence with the arm 64 when the latter is in its position of connection with such contact. The winding of the solenoid 25 is in series with the contacts 8 of the relay 7, the winding of the solenoid 72 and the contact 67 and thence with the arm 64 when the latter is in its position of connection with such contact. The winding of the solenoid 30 is in series with the contacts 6 of the relay 5, the winding of the solenoid 60 and the contact 66 and thence with the arm 64 when the latter is in its position of connection with such contact.

The pair of contacts 34 is in series with the winding of the solenoid 52 and with the contact 68 and thence with the arm 64 when the latter is in its position of connection with such contact. The pair of contacts 40 is in series with the winding of the solenoid 56 and with the contact 69 and thence with the arm 64 when the latter is in its position of connection with such contact. The pair of contacts 44 is in series with the winding of the solenoid 56 and with the contact 66 and thence with the arm 64 when the latter is in its position of connection with such contact. The pair of contacts 48 is in series with the winding of the solenoid 52 and with the contact 66 and thence with the arm 64 when the latter is in its position of connection with such contact.

The winding of the electro-magnetic release 37 is in series with the contacts 55 and with the contact 68 and thence with the arm 64 when the latter is in its position of connection with such contact. The winding of the electro-magnetic release 43 is in series with the contacts 59 and with the contact 69 and thence with the arm 64 when the latter is in its position of connection with such contact. The winding of the electro-magnetic release 47 is in series with the contacts 59 and with the contact 66 and thence with the arm 64 when the latter is in its position of connection with such contact. The winding of the electro-magnetic release 51 is in series with the contacts 55 and with the contact 66 and thence with the arm 64 when the latter is in its position of connection with such contact.

The operation will be as follows:—The contact arm 64 occupying its position of connection with the contacts 68 and 69 and the temperature of the material under treatment being within allowable limits, such for example as above 195° Fahrenheit and below 205° Fahrenheit, the contacts of the thermometer 2 will be bridged by the mercury thereby placing the winding of the relay 7 in closed circuit with the current from the source 3 and so causing such relay to maintain its contacts 8 in open condition.

While this condition of affairs obtains the apparatus will remain at rest. In the event of the said temperature rising to 205° or over however, the mercury will bridge the contacts of the thermometer 1 thereby placing the winding of the relay 5 in closed circuit with the source 3 through the closed contacts 4, the said relay 5 will therefore become energized and close the contacts 6 thereby energizing the solenoid 15 which will in turn operate the steam valve 13 in the closing direction. The solenoid 15 in so operating will close the contacts 34 and become locked in its said operative position by the detent 35. The closing of the contacts 34 will cause the solenoid 52 to become energized and so raise its core which has the effect of first permitting the contacts 4 to open thereby restoring the relay 5 to its previous condition and then closing the contacts 55 thereby energizing the release 37 and so permitting the core of the solenoid 15 to return under action of its spring 24 to its previous or normal position leaving the valve 13 in the position in which it was set by the said operative movement of the solenoid. This return of the solenoid 15 to its normal position allows the contacts 34 to again resume their normal condition thereby de-energizing the solenoid 52 which therefore permits its core to sink against the influence of the dash-pot 53 thus restoring the contacts 55 and the contacts 4 to their previous conditions of open and closed respectively. If when the said parts have resumed their normal positions again the temperature should still be too high the above described cycle of operation will again occur thus effecting a further closing of the steam valve.

In the event of the temperature falling below 195° however, the mercury of the thermometer 2 will break the connection between its two terminals thereby de-energizing the relay 7 and so permitting the contacts 8 to close, thus energizing the windings of the solenoids 61 and 16, which latter will in turn operate the steam valve 13 in the opening direction. The solenoid 16 in so operating will close the contacts 40 and become locked in its operative position by the detent 41. The closing of the contacts 40 will cause the solenoid 56 to become energized and so raise its core which has the effect of first permitting the contacts 9 to close and so restore the relay 7 to its previous condition and then closing the contacts 59 thereby energizing the release 43 and so permitting the core of the solenoid 16 to return under action of its spring 24 to its previous or normal position leaving the valve 13 in the position in which it was set by the said operative movement of the solenoid. As above mentioned the solenoid 61 is also energized and therefore attempts to lift its core. Owing however, to the restraining influence of its dash-pot 63 this action is delayed to such an extent that the cycle of operations in connection with the solenoid 16 will have taken place before the solenoid 61 has effected its movement to the extent necessary to operate the arm 70. If the temperature has not risen to 195° by the time the solenoid 16 has resumed its normal condition the same cycle of operations will be repeated.

In practice the steam-valve 13 and the material-regulating valve 14 will be provided with stops of any suitable nature adapted to limit the extent of their opening and closing movements. In the present instance, a bearing 96 is provided for the spindle 13ª of valve 13, and a collar 97 is secured by a set screw on said spindle, said collar being slidable upon the spindle so that it may be adjusted to contact with the bearing 96 and thus limit the opening of the valve. In the case of the material valve 14, the spindle 14ª passes through a plate 98 having a series of openings 99 adapted to receive a pin, the spindle being provided with a radial projection or lug 100 which, upon rotation of the spindle to open the valve, will contact with said pin, thus limiting the opening of said valve.

In the event therefore, of the steam-valve 13 having reached the limit of its opening movement while the temperature still remains too low the solenoid 16 will attempt to perform its movement as above described but, owing to the engagement of the valve by its stop, such effort will become abortive before the contacts 40 are operated. The current will therefore, continue to flow through the solenoids 16 and 61 until the latter has had time to raise its core and operate the arm 70 thereby turning the arm 64 from its previous position of connection with the contacts 68 and 69 to its position of connection with the contacts 66 and 67. This breaking of the connection between the contact 69 and the arm 64 will de-energize the solenoid 16. The establishment of connection between the said arm 64 and the contact 67 will have the effect of energizing the solenoids 72 and 25 which latter will in turn operate the valve 14 in the closing direction thereby reducing the supply of the material for treatment which action will therefore permit of the heat building up. The solenoid 25 in so operating will close the contacts 44, and become locked in its operative position by the detent 45. The closing of the contacts 44 will cause the solenoid 56 to become energized and so raise its core which has the effect of first permitting the contacts 9 to close and so restore the relay 7 to its previous condition and then closing the contacts 59 thereby energizing the release 47 and so permitting the core of the solenoid 25 to return under action of its spring 24 to its previous or normal position leaving the valve 14 in the position in which it was set by the said operative movement of the solenoid.

As already mentioned the energizing of the solenoid 25 is accompanied by an energizing of the solenoid 72, the latter however, like the solenoid 61, is so delayed in its action by its dash-pot 73 that it will not have raised its core to the necessary extent to operate the contacts 12 before the described cycle of operations in connection with the solenoid 25 has been accomplished. If the temperature has not risen to 195° when the solenoid 25 has returned to its normal condition, the operation will be repeated thus effecting a further closing of the valve 14.

Should the temperature still remain below 195° when the valve 14 has been closed to the limit permitted by its stop, the solenoid 25 will, like the solenoid 16, make an abortive attempt to operate but, by reason of its failure to close the contacts 44, will remain in this condition thereby allowing the solenoid 72 to operate and close the contacts 12 and so cause the bell 11 to ring, thus announcing the condition of affairs to the attendant.

In the event of the temperature rising above 205° when the arm 64 is in its position of connection with the contacts 66 and 67, the consequent bridging of the contacts of the thermometer 1 and the resultant closing of the contacts 6 by the relay 5 will serve to energize the solenoids 60 and 30 which latter will in turn operate the valve 14 in the opening direction.

The solenoid 30 in so operating will close the contacts 48 and become locked in its operative position by the detent 49. The closing of the contacts 48 will cause the solenoid 52 to become energized and so raise its core which has the effect of first permitting the contacts 4 to open and so restore the relay 5 to its previous condition and then closing the contacts 55 thereby energizing the release 51 and so permitting the core of the solenoid 30 to return under action of its spring 24 to its previous or normal position leaving the valve 14 in the position in which it was set by the said operative movement of the solenoid.

As above mentioned the energizing of the solenoid 30 is accompanied by an energizing of the solenoid 60. In consequence of the restraining influence of the dash-pot 62 however, the action of the solenoid 60 will, similarly to that of the solenoid 61, be so far delayed as to prevent it from operating the arm 70 before the cycle of operations in connection with the solenoid 30 has been accomplished.

In the event of the valve 14 having reached the limit of its opening movement while the temperature still remains too high, the solenoid 30 will attempt to perform its movement as above described but owing to the engagement of the valve by its stop, such efforts will become abortive before the contacts 48 are operated. The current will therefore continue to flow through the solenoids 30 and 60 until the latter has had time to raise its core and operate the arm 70 thereby turning the arm 64 from its position of connection with the contacts 66 and 67 to its position of connection with the contacts 68 and 69. This breaking of the connection between the contacts 66 and the arm 64 will de-energize the solenoid 30. The establishment of connection between the said arm 64 and the contact 68 will have the effect of energizing the solenoid 15 which will in consequence again perform its operation of closing the steam valve 13 in the manner already explained.

It will be understood that the periods occupied by the return movements of the cores of the solenoids 52 and 56 determine the intervals of time between which the succeeding operations of the valves 13 and 14 can take place and further it will be understood that such periods are governed by the setting of the needle-valves of the corresponding dash-pots 53 and 57. Thus for example, in cases where it is desired that the steam valve shall not be operated in the closing direction oftener than at intervals of say thirty minutes apart, the needle-valve of the dash-pot 53 will be so adjusted as to produce a delay of thirty minutes in the return movement of the core of the solenoid 52.

In all cases however, needle-valves of the dash-pots 62, 63 and 73 will be set to provide relatively greater delays in the lifting movements of their corresponding solenoids 60, 61 and 72 as already described.

In cases where it is desired to effect the control by one method only, that is to say, by regulating the supply of material for treatment or by regulating the flow of the heating fluid, the change-over switch comprising the arm 64 with its co-operating contacts 66, 67, 68, 69 and solenoids 60 and 61 will, of course, be dispensed with since but one pair of valve-operating solenoids will be employed.

I claim:

1. An apparatus of the class described, comprising, in combination, valves operable to govern respectively the flow of heating medium and the supply of material to be treated, two sets of electro-magnetic means, one operable to mechanically actuate said medium-valve alternately in the opening and closing directions and the other operable to similarly actuate said material-valve alternately in the opening and closing directions, an electric current supply for said electro-magnetic means, a pair of relays governing said supply and operable one to control said electro-magnetic means in closing said medium-valve and in opening said material valve and the other to control said electro-magnetic means in opening said medium-valve and in closing said material-valve, an electric current supply for energizing said relays, and thermostatic means located in the thermal influence of said material under treatment and adapted to control contacts in last said supply thereby to cause first said relay to render its controlled electro-magnetic means operable to close said medium-valve and open said material-valve at a predetermined rise of temperature and to cause the other said relay to render its controlled electro-magnetic means operable to open said medium-valve and close said material-valve at a predetermined fall of temperature.

2. An apparatus as set forth in claim 1, the valve-controlling means being provided with pawls adapted to be actuated by the operative movements of the valve-controlling means to engage ratchet-wheels operatively connected with the valves thereby to actuate the latter.

3. An apparatus as set forth in claim 1, having means for returning said electro-magnetic valve operating means to its initial position after each operative movement, leaving the valve in the position in which it was placed by said operative movement.

4. An apparatus as set forth in claim 1, said electro-magnetic valve-controlling means comprising separate solenoids for controlling the opening and closing movements of the valve.

5. An apparatus as set forth in claim 1, said electro-magnetic valve operating means being provided with springs for returning said means into position when de-energized.

6. In an apparatus as set forth in claim 1, means for restoring said electro-magnetic means to initial position, said restoring means being actuated by said electro-magnetic valve-controlling means during its operative movement upon the valve.

7. In an apparatus as set forth in claim 1, means for temporarily restoring and maintaining said controlling relays in initial position until said electro-magnetic means have returned to normal position, said restoring means being actuated by the electro-magnetic valve-operating means during its operative movement upon the valve.

8. An apparatus of the class described, comprising a valve operable to govern the quantitative ratio of a treating medium to a material to be treated, electro-magnetic means operable to mechanically control the opening and closing of said valve, thermostatic means located in the thermal influence of the material under treatment and controlling said electro-magnetic means, thereby to cause the latter to open and close said valve in response to predetermined variations of the temperature of said material, and means for cutting out said thermostatic control during a predetermined period of time, said cutting out means being actuated by said electro-magnetic means during each of its actuations of the valve thereby to interpose a minimum time interval between two successive operations of the valve in the same direction.

9. An apparatus as set forth in claim 8, said cutting out means being adjustable thereby to regulate the length of time during which the thermostatic control of the electro-magnetic means is cut out.

10. In an apparatus as set forth in claim 1, a detent operative to lock said valve actuating means in its extreme operative position, contacts adapted to be closed by the operative movement of said valve controlling means, and electro-magnetic means adapted to be energized by the closing of said contacts thereby to restore said valve actuating means to initial position.

11. In an apparatus as set forth in claim 1, a detent operative to lock said valve actuating means in its extreme operative position, contacts adapted to be closed by the operative movement of said valve controlling means, and electro-magnetic means adapted to be energized by the closing of said contacts thereby to restore said valve actuating means to initial position, an electro-magnetic release for disengaging said valve actuating means from the detent, said restoring means when energized being operative first to restore the relay to initial position and cut out the thermostatic control of the relay, then to operate said release and then, after a predetermined lapse of time, to restore the control of the relay by the thermostatic contacts.

12. An apparatus of the class described, comprising valves for controlling respectively the flow of a treating medium and a supply of material to be treated, two separate electro-magnetic devices for each valve one to open and the other to close the same, stops for said valves to determine the opening and closing limits thereof, an electric current supply for said valve-controlling devices, relay contacts controlled by said relay so connected as to alternately control the said current supply to the closing device for the medium-valve and to the opening device for the material-valve, a second relay, contacts controlled by said relay and so connected as to alternately control the said current supply to the opening device for the medium-valve and to the closing device for said material-valve, an electric current supply for energizing said relays, thermostatic means located in the thermal influence of the material under treatment, contacts disposed in last said current supply and operated by said thermostatic means at a predetermined rise of the temperature of said material thereby to render first said relay operative upon its controlled circuit and at a predetermined fall of such temperature to render said second relay operative upon its controlled circuit, and a change-over switch interposed in first-said current supply and operating automatically when the medium-valve reaches the limit of its opening movement to transfer the control of said second relay from the opening device of the medium-valve to the closing device of the material-valve and when the material-valve reaches the limit of its opening movement to transfer the control of first said relay from the opening device of said material-valve to the closing device of said medium-valve.

13. An apparatus as set forth in claim 12, said automatically operating switch comprising an electro-magnetic device connected in series with said medium-valve opening device, and means for impeding the movements of said device thereby to permit the normal opening of said medium-valve before the change-over switch can be operated, and an electro-magnetic device connected in series with the material-valve opening device for transferring the control from the opening device of the material-valve to the closing device of the medium-valve and means for impeding the movements of said last magnetic device to permit the opening of said material valve before the change-over switch can be operated.

14. An apparatus of the class described, comprising a valve to govern the supply of a material to be treated, two separate electro-magnetic devices one to control the opening and the other to control the closing of said valve, stops limiting the opening and closing movements of said valve, an electric current supply for said devices, thermostatic means located in the thermal influence of the material under treatment, contacts controlled by said thermostatic means thereby to effect the energizing of said valve-opening device in response to a predetermined rise of the temperature of said material and to effect the energizing of said valve-closing device in response to a predetermined fall of such temperature, and an electro-magnetic device connected in series with said valve-closing device and a signal adapted to be operated by said electro-magnetic device in the event of the failure of the temperature to rise to a predetermined point when the valve has been closed.

15. In an apparatus as set forth in claim 14, means for impeding the movement of said signal operating electro-magnetic device thereby to prevent operation of the signal during the time necessary for the normal closing of the valve.

In testimony whereof I have hereunto affixed my signature.

THOMAS LOFTUS JONES.